United States Patent
Stoutenburg et al.

(10) Patent No.: US 7,428,982 B2
(45) Date of Patent: *Sep. 30, 2008

(54) SYSTEMS AND METHODS FOR PRICE MATCHING ON FUNDS TRANSFERS

(75) Inventors: Earney E. Stoutenburg, Parker, CO (US); Dean A. Seifert, Parker, CO (US)

(73) Assignee: The Western Union Company, Englewood, CO (US)

( * ) Notice: Subject to any disclaimer, the term of this patent is extended or adjusted under 35 U.S.C. 154(b) by 502 days.

This patent is subject to a terminal disclaimer.

(21) Appl. No.: 11/155,335

(22) Filed: Jun. 16, 2005

(65) Prior Publication Data

US 2006/0143118 A1 Jun. 29, 2006

Related U.S. Application Data

(63) Continuation-in-part of application No. 10/290,041, filed on Nov. 7, 2002, now Pat. No. 6,908,031, which is a continuation-in-part of application No. 09/427,249, filed on Oct. 26, 1999, now Pat. No. 6,488,203.

(51) Int. Cl.
*G06F 17/60* (2006.01)
(52) U.S. Cl. ........................... 235/379; 235/382
(58) Field of Classification Search .................. 385/15, 385/27, 30, 37, 39
See application file for complete search history.

(56) References Cited

U.S. PATENT DOCUMENTS

| | | | | |
|---|---|---|---|---|
| 5,650,604 A | * | 7/1997 | Marcous et al. | 235/379 |
| 5,897,620 A | * | 4/1999 | Walker et al. | 705/5 |
| 5,913,202 A | * | 6/1999 | Motoyama | 705/36 R |
| 5,949,044 A | * | 9/1999 | Walker et al. | 235/379 |
| 6,324,522 B2 | * | 11/2001 | Peterson et al. | 705/28 |
| 6,488,203 B1 | * | 12/2002 | Stoutenburg et al. | 235/379 |
| 6,908,031 B2 | * | 6/2005 | Seifert et al. | 235/379 |
| 2001/0037281 A1 | * | 11/2001 | French et al. | 705/37 |

* cited by examiner

*Primary Examiner*—Daniel StCyr
(74) *Attorney, Agent, or Firm*—Townsend and Townsend and Crew LLP (57) ABSTRACT

Systems and methods for performing financial transfers. In some instances, the methods include providing a staged transaction system that includes at least two stages. Quotes are accessed for the first and for the second stage of the transaction. One quote associated with a stage of the transaction is selected and used to consummate the financial transfer. Other methods include marketing financial transfer transactions. Such marketing can include providing a flexible rate fixing mechanism; monitoring a financial transaction market; and fixing a rate based at least in part on monitoring the financial transaction market where the flexible rate fixing mechanism provides access to the fixed rate.

31 Claims, 7 Drawing Sheets

SYSTEMS AND METHODS FOR PRICE MATCHING ON FUNDS TRANSFERS

CROSS-REFERENCES TO RELATED APPLICATIONS

This application is a continuation in part of U.S. patent application Ser. No. 10/290,041, entitled "Systems and Methods for Price Matching On Funds Transfers", filed Nov. 7, 2002, now U.S. Pat. No. 6,908,031, which is a continuation in part of U.S. patent application Ser. No. 09/427,249, entitled "Method and System for Performing Money Transfer Transactions", filed on Oct. 26, 1999, now U.S. Pat. No. 6,488,203 sharing a common inventor with and assigned to the assignee of the present invention. The aforementioned Patent Applications are incorporated herein by reference for all purposes.

BACKGROUND OF THE INVENTION

The present invention relates generally to the field of value transfers, and in particular to systems and methods for providing quotes in relation to value transfers.

Value transfers can be performed by financial services institutions to transfer funds or other value from a sender to a recipient. In some cases, a value transfer can include accepting an amount to be transferred along with a transaction fee from a sender. The value is then transferred to a recipient, and the transaction fee is kept by the transferring financial services institution. Such transaction fees can vary based on one or more circumstances, and potentially lead to confusion on the part of either the sender or receiver. Accordingly, there exists a need in the art to address the variability of such transaction fees.

SUMMARY OF THE INVENTION

Systems and methods for performing financial transfers. Such systems and methods can provide flexibility in fixing transaction fees associated with one or more financial transfer types. Thus, in some cases, transaction fees can be determined based on an analysis of a financial transaction market. In such a way, a company providing financial transaction services can be enabled to more effectively compete for financial transaction business.

In one embodiment of the present invention, a method for providing financial transfer transactions is disclosed. The method includes providing a staged transaction system involving two or more transaction stages. Quotes are accessed for both of the transaction stages, and a quote associated with one or the other transaction stages is selected and used to consummate the financial transfer transaction. In some cases, the accessed quotes are provided to a consumer or even a clerk helping the consumer consummate a financial transfer transaction. Further, in some instances, the selected quote can be the lower of the two accessed quotes.

In various cases of the embodiment, the method additionally includes providing an identification code in association with the first stage, and receiving a request to perform the second stage, wherein the request includes the identification code. In yet other instances, the method additionally includes storing information associated with the first stage, wherein the information includes the amount to be transferred in association with the value transfer, the first quote, and the identification code.

Other embodiments of the present invention provide methods for performing a money transfer send transaction. Such methods include receiving a request for a send transaction; providing a first quote associated with the send transaction; receiving a request to consummate the send transaction; accessing a second quote associated with the request to consummate the send transaction; and selecting one of the first quote and the second quote, wherein the selected quote is used to consummate the send transaction.

Yet other embodiments provide systems for facilitating staged financial transactions. Such systems include a computer including a processor and a computer readable medium. The computer readable medium comprises instructions executable by the processor to: receive a request for a transaction, access a first quote in relation to the transaction, receive request to consummate the transaction, and access a second quote in relation to the request to consummate the transaction.

In yet further embodiments of the present invention, methods for marketing financial transfer transactions are provided. Such methods include providing a flexible rate fixing mechanism. Such a rate fixing mechanism can be a central computer that can be accessed by one or more outlets offering financial transfer products and/or services. The central computer can be vested with information obtained from monitoring a financial transaction market.

The monitoring can include, but is not limited to, monitoring a transaction cost associated with a similar financial transfer transaction product and/or monitoring a volume of the financial transaction market serviced by a transaction processor. Such monitoring of volume can include, but is not limited to, monitoring a net volume that is the volume of the value of transaction fees associated with financial transfer transactions. Other examples can include monitoring a gross volume that is the volume of the value of financial transfer transactions, monitoring a net time volume that is the volume of the value of transaction fees during a period of time, monitoring a gross time volume that is the volume of the value of financial transfer transactions during a period of time, monitoring a net location volume that is the volume of the value of transaction fees at a location, and/or monitoring a gross location volume that is the volume of the value of financial transfer transactions at a location.

The embodiment further includes fixing a rate based at least in part on monitoring the financial transaction market, wherein the flexible rate fixing mechanism provides access to the fixed rate. In some cases, fixing the rate includes setting a rate for performing the financial transfer transaction, and wherein the fixed rate is based at least in part on one or more of the following: a geographic location of the sender, a geographic location of the recipient, a time of day that the financial transfer transaction is initiated, an amount of time required to complete the financial transfer transaction, a type of financial transfer transaction, a type of recipient, and a type of sender. Identifying the type of sender can include characterizing the frequency at which the sender performs financial transfer transactions.

In some cases, such an embodiment can provide advantages of providing a dynamic flexibility to applying a transaction fee to one or more transactions. Thus, transaction fees can be developed based on criteria relevant to the specific transaction and applied to the transaction. Such criteria can include, but are not limited to, the location of either or both of the sender and recipient, the type of transaction being processed, the time at which the transaction is being processed, and the like. Further, in some cases, this flexibility can be used by a business to provide competitive pricing for a particular financial product.

This summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Among other things, the present invention provides systems and methods for performing various value transfers. In some instances, such value transfers include one or more stages involving a varying transaction fee structure. In such cases, the present invention provides systems and methods for reducing the varying transaction fee structure to a single transaction fee. In particular instances, the single transaction fee is the lowest available fee from the varying transaction fee structure. In other cases, more complex rules are implemented to derive the single fee from the varying transaction fee structure.

Figure 1:
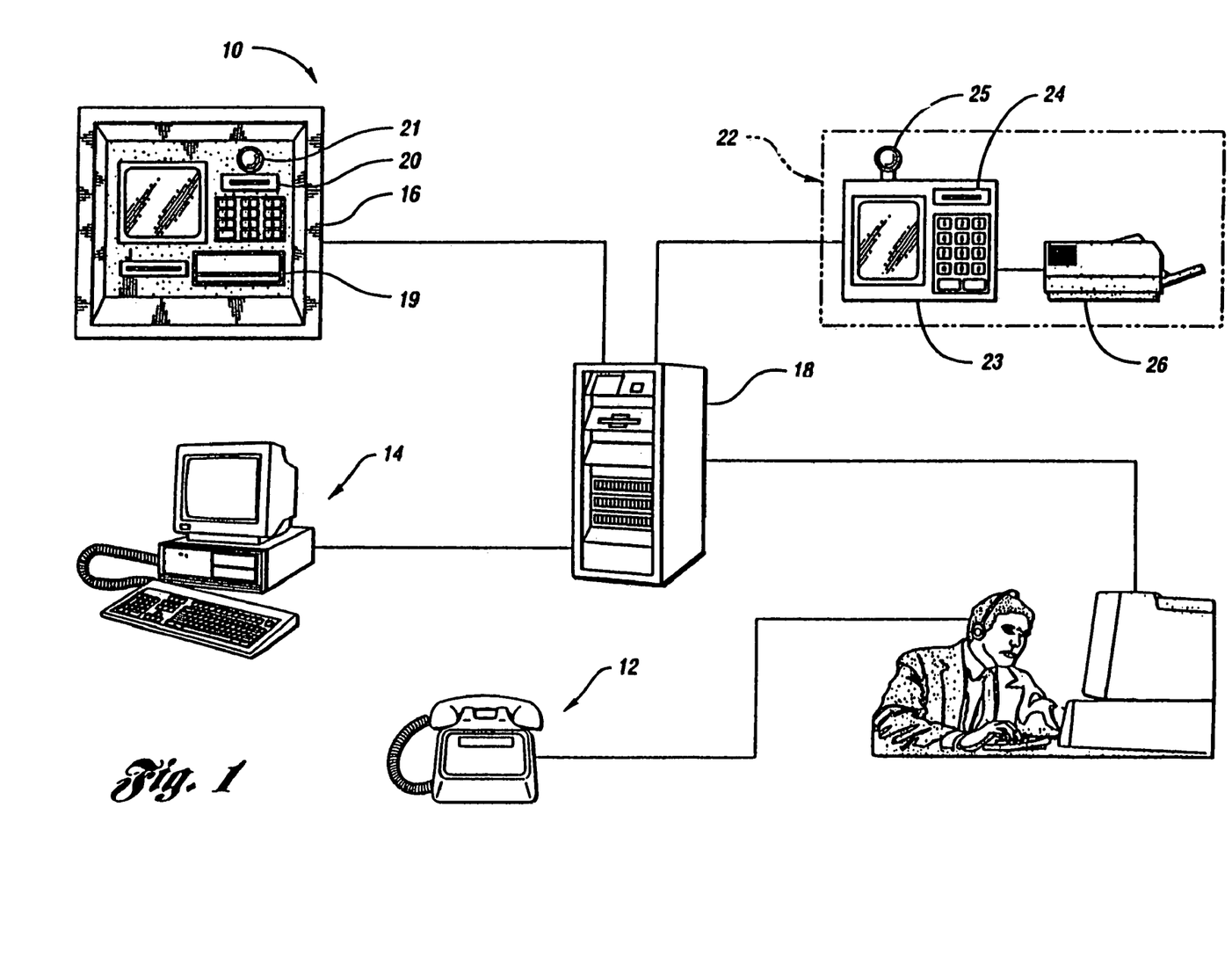
FIG. 1 is a schematic diagram of one embodiment of a system according to the invention for performing a money transfer transaction through a financial services institution.

FIG. 1 shows a system 10 according to various embodiments of the invention for performing an electronic data transfer to effect a money transfer transaction with a financial services institution. Such money transfer transactions can include send transactions and receive transactions. Under a send transaction, a sender electronically sends or "wires" money to a recipient through the financial services institution. Under a receive transaction, the recipient receives the money through the financial services institution. These money transfer transactions may also be facilitated by an agent that may receive a commission for each transaction. Agent, as used herein, refers to a person who assists in one or more money transfer transactions through the financial services institution, and may be either a direct employee or not a direct employee of the financial services institution. Furthermore, both the sender and the recipient may be referred to as customers of the financial services institution and/or the agent.

System 10 includes one or more transaction set-up or staging devices, such as a telephone 12, a personal computer ("PC") 14, and/or a kiosk 16. PC 14 has an alpha-numeric keypad, a central processing unit and a display device such as a monitor. Kiosk 16 is an unattended electronic device capable of receiving input and displaying information. For example, kiosk 16 may be an automated teller machine or ATM. Either alternatively, or in addition, kiosk 16 may include a PC interfaced with the Internet, a telephone, a funds acceptance device and/or any combination thereof. U.S. patent application entitled "Multi-Purpose Kiosk and Methods" that was previously incorporated by reference for all purposes contains additional details regarding various such kiosks.

These transaction staging devices are used to access the financial services institution and to obtain and/or provide transaction details regarding a particular transaction as explained below in greater detail. Advantageously, the transaction staging devices may be disposed at numerous locations remote from the financial services institution to provide extensive access to the financial services institution. For example, one or more transaction staging devices may be disposed at each of several agent locations, such as convenience stores, drug stores, or other suitable facilities. As another example, one or more transaction staging devices may be disposed at the consumer's home or place of business.

Telephone 12 is preferably configured to provide direct and immediate access to a customer services representative (CSR) or other employee of the financial services institution. For example, telephone 12 may be automatically connected to the CSR simply by picking up the handset. Alternatively, the telephone 12 may be any type of telephone such as a pay telephone, cellular telephone, or home telephone. Furthermore, the CSR has access to a central data base or host computer 18 of the financial services institution, and the CSR can enter information into and receive information from host computer 18. Alternatively, the CSR may have access to a secondary data base that is in communication with host computer 18.

PC 14 and kiosk 16 are also in communication with host computer 18 either directly or indirectly, such as through a secondary data base. Advantageously, the sender and/or recipient may use PC 14 and/or kiosk 16 to directly or indirectly access host computer 18. For example, the sender may use PC 14 to access host computer 18 through the internet. Kiosk 16 may also be provided with a card encoder or dispenser 19, a card reader 20, and a scanning device 21 such as a voice scanner, fingerprint scanner, a retina scanner or a face scanner. Alternatively, kiosk 16 may be provided with multiple scanning devices.

System 10 further includes an electronic transaction fulfillment device, such as an electronic terminal 22 having a keypad 23, for completing the money transfer transaction. Alternatively or in addition, electronic terminal 22 may be provided with a card reader 24 and/or a scanning device 25 such as a fingerprint scanner, a retina scanner or a face scanner. Furthermore, electronic terminal 22 may be provided with multiple scanning devices. Electronic terminal 22 is in communication with host computer 18, and is used to retrieve transaction details stored on host computer 18. In one embodiment of system 10, electronic terminal 22 is a PC having an alpha-numeric keypad, a central processing unit, and a display device such as a monitor. In another embodiment of system 10, electronic terminal 22 is an FDX-400® available from Western Union of Englewood, Colo. The FDX-400® has a numeric keypad, one or more function keys and a display device. Yet other embodiments of electronic terminal 22 are disclosed in U.S. patent application Ser. No. 10/116,689, entitled "Systems and Methods for Performing Transactions at a Point-of-Sale"; U.S. patent application Ser. No. 10/116,733, entitled "Systems and Methods for Deploying a Point-of-Sale Device"; U.S. patent application Ser. No. 10/116,686, entitled "Systems and Methods for Utilizing a Point-Of-Sale System"; and U.S. patent application Ser. No. 10/116,735, entitled "Systems and Methods for Configuring a Point-Of-Sale System". Each of the aforementioned patent applications was filed on Apr. 3, 2002, and each is incorporated herein by reference for all purposes.

Electronic terminal 22 also preferably includes a printer 26 for printing a record of the value transfer transaction. For example, electronic terminal 22 may be used to print a receipt and/or a negotiable instrument, such as a check or money order. Alternatively, a printer may be provided as a separate component that is in communication with electronic terminal 22 and host computer 18.

It should be noted that the transaction staging device and the electronic fulfillment device may be the same device. For example, if kiosk 16 is able to print a record of the money transfer transaction through an on-board printer or a remote printer, kiosk 16 may also function as the electronic fulfillment device. As another example, if electronic terminal 22 is able to receive alpha-numeric input, electronic terminal 22 may also function as the transaction staging device.

Figure 2:
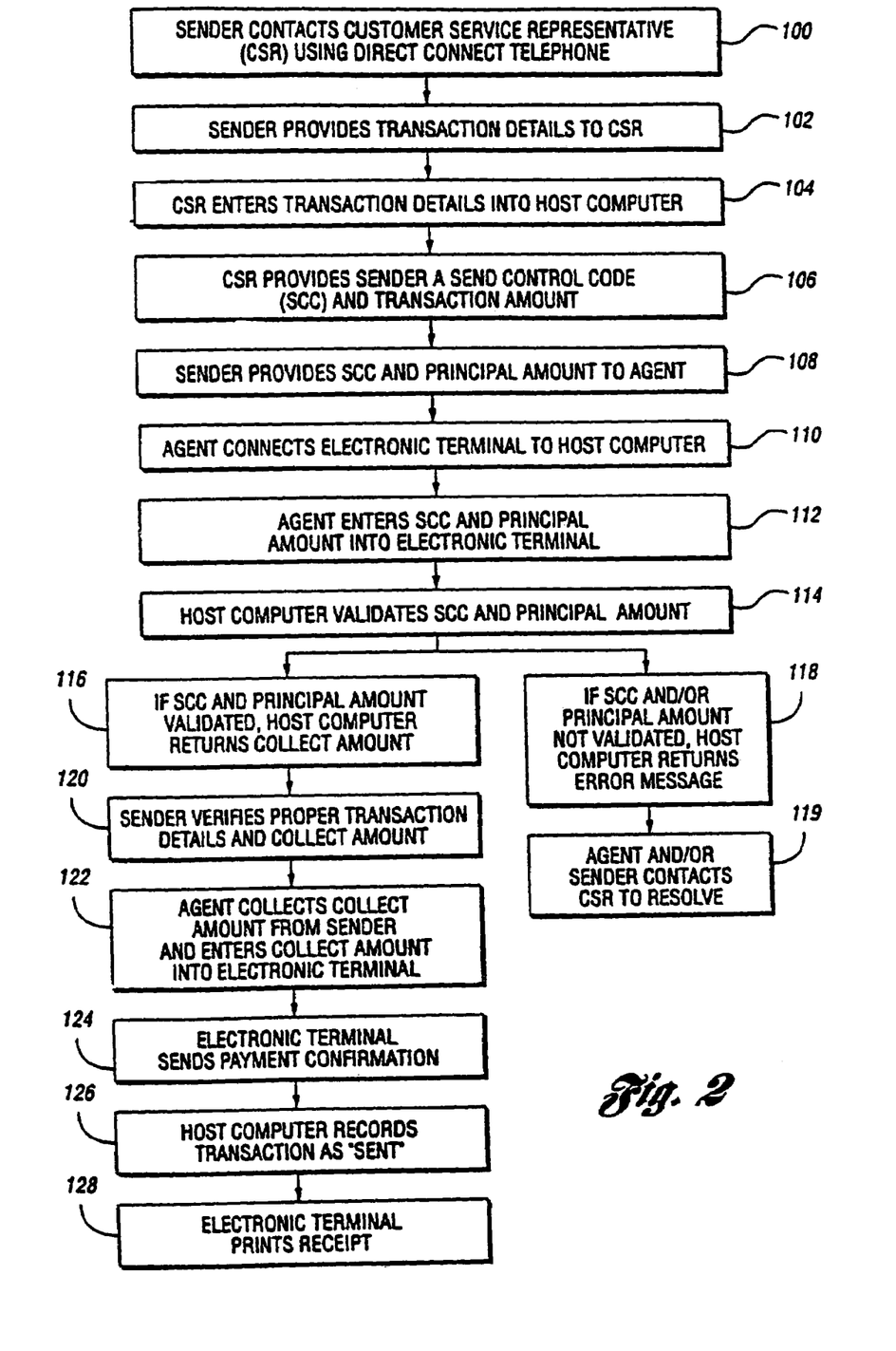
FIG. 2 is a flow chart illustrating operation of a system and/or method in accordance with some embodiments of the present invention for performing a send transaction.

FIG. 2 is a flow chart illustrating operation of a method and/or system, such as system 10, for performing a send transaction according to the invention. The send transaction can be divided into a transaction set-up or staging process and a transaction fulfillment process. At process 100, the sender begins the transaction staging process by using the telephone 12 to contact the CSR. Next, the sender provides transaction information or details to the CSR at process 102. Such details may include the sender's name and address, recipient name, and a desired amount of money to be sent to the recipient, which may be referred to as principal amount. At process 104, the CSR enters the transaction details into host computer 18. For example, the CSR may enter the transaction details into a separate computer that downloads data to host computer 18 at a later time. If the desired amount of money to be sent is over a certain amount, the host computer 18 may also request supplemental information from the sender, such as the driver's license number, social security number, date of birth, etc. in order to comply with institutional and/or regulatory requirements.

At process 106, the CSR provides the sender a send control code ("SCC") or identification code, and a transaction amount, which represents the principal amount plus any transaction fee and taxes, if applicable. If a printer is located proximate telephone 12, the SCC and transaction amount may be printed on paper. The SCC and transaction amount are also stored on host computer 18 as part of the transaction details. The SCC is preferably a numeric code and is used to uniquely identify the send transaction on host computer 18. The SCC may, however, comprise one or more alpha-numeric characters, symbols, sounds, and/or images. For example, the SCC may be the sender's name, the recipient's name, a bar code, or other decipherable symbol or symbols. Furthermore, the SCC may be printed using an optical character recognition font (OCR), and/or magnetic ink.

Alternatively, the SCC and transaction amount may be obtained or otherwise established by using PC 14, kiosk 16, or any other suitable transaction staging device to access host computer 18 directly or indirectly. For example, PC 14 may be used to access host computer 18 through the internet, and host computer 18 may provide the SCC and the transaction amount directly to the sender such as by electronic mail. As another example, if kiosk 16 is provided with one of scanning devices 21 described above, kiosk 16 may be used to establish the SCC as the sender's voice print, fingerprint, retinal image, facial image and/or other anatomical image. As another example, if kiosk 16 or other transaction staging device is provided with the card dispenser 19, kiosk 16 may be used to encode and dispense a card with the SCC and/or the transaction amount printed or otherwise encoded, such as magnetically or electronically, thereon. As yet another example, another example, a source of cards having different SCC's pre-printed or otherwise encoded thereon, may also be disposed proximate kiosk 16. During the transaction staging process, one of the cards may be selected by the sender and swiped across or otherwise entered into card reader 20 of kiosk 16 so that host computer 18 can correlate the particular SCC with the transaction details entered by the sender. Host computer 18 may then provide the transaction amount to the sender.

Once the SCC and transaction amount have been obtained by the sender, the transaction staging process is complete. At this point, been the send transaction is maintained on host computer 18 in a pending state. If the send transaction does not progress to the transaction fulfillment process within a predetermined amount of time, the send transaction may be purged from host computer 18.

Because the sender can deal directly with the CSR or host computer 18, the transaction staging process is relatively simple and efficient. As a result, money transfer transactions may be performed at a variety of locations, such as convenience stores, drug stores, service stations and the like, thereby increasing the distribution network of the financial services institution. Advantageously, there are no forms that need to be completed by the sender, nor are any agents required to be involved in the transaction staging process. Furthermore, the sender may be provided access to various CSR's having various foreign language competencies in order to accommodate language differences.

At process 108, the sender begins the transaction fulfillment process by providing the SCC and principal amount, or just the SCC, to an agent at the agent location. Next, the agent connects electronic terminal 22 to host computer 18 by pressing a function key on keypad 23 at process 110. At process 112, the agent enters the SCC and the principal amount into electronic terminal 22 by using the keypad 23. Advantageously, because the SCC can be a numeric code, keypad 23 need only include numbers and one or more function keys. Alternatively, the SCC may be entered into electronic terminal 22 using card reader 24 or scanning device 25.

At process 114, host computer 18 may validate the SCC and principal amount by comparing the SCC and principal amount with the transaction details previously stored on host computer 18 during the transition staging process. If the SCC and/or principal amount are valid, host computer 18 returns some or all of the transaction details and a collect amount, which is the same as the transaction amount, to electronic terminal 22 as indicated at process 116. Alternatively, some or all of the transaction details may be routed to electronic terminal 22, or other transaction fulfillment device, prior to the sender entering the SCC. For example, multiple send transactions may be queued on electronic terminal 22, with each transaction being identified by a particular sender's name. In this case, the SCC is the particular sender's name, and the transaction fulfillment process may be commenced by the sender highlighting or otherwise entering his/her name into electronic terminal 22.

If the SCC and principal amount are not valid, host computer 18 returns an error message to electronic terminal 22 as indicated as process 118. The agent and/or sender may then contact the CSR to resolve the error as indicated at process 119.

If the SCC code and principal amount are valid, the agent verifies with the sender that the proper transaction details and collect amount were returned by host computer 18, as indicated at process 120. For example, the sender may view the transaction details on a display device of electronic terminal 22. If the transaction details are not correct, and if electronic terminal 22 can accept alpha-numeric input, the agent and/or sender may be able to revise the transaction details. Alternatively, the agent and/or sender may contact the CSR to revise the transaction details.

Next, the agent collects the collect amount from the sender and enters the amount tendered into electronic terminal 22 at process 122. Electronic terminal 22 then sends payment confirmation to host computer 18 at process 124. Next, at process 126, host computer 18 records the send transaction as "sent" and sends confirmation to electronic terminal 22. At this point, funds are available to be picked up by the recipient. At process 128, the electronic terminal prints a receipt for the sender.

Because the agent need not be involved in the transaction staging portion of each send transaction, the agent can process significantly more send transactions in the same amount of time compared with prior systems and methods. Furthermore, because the transaction fulfillment portion is controlled by the host computer 18, agents require less training to operate the system and method of the invention.

Alternatively, the transaction fulfillment process may be accomplished without an agent. For example, the transaction fulfillment process may be carried out by using kiosk 16 or any other suitable device that is connected directly to or in communication with host computer 18. The transaction fulfillment process may be commenced by the sender entering the SCC into kiosk 16 using a keypad, card reader 20, and/or scanning device 21 of kiosk 16, depending on the type of SCC.

Figure 3:
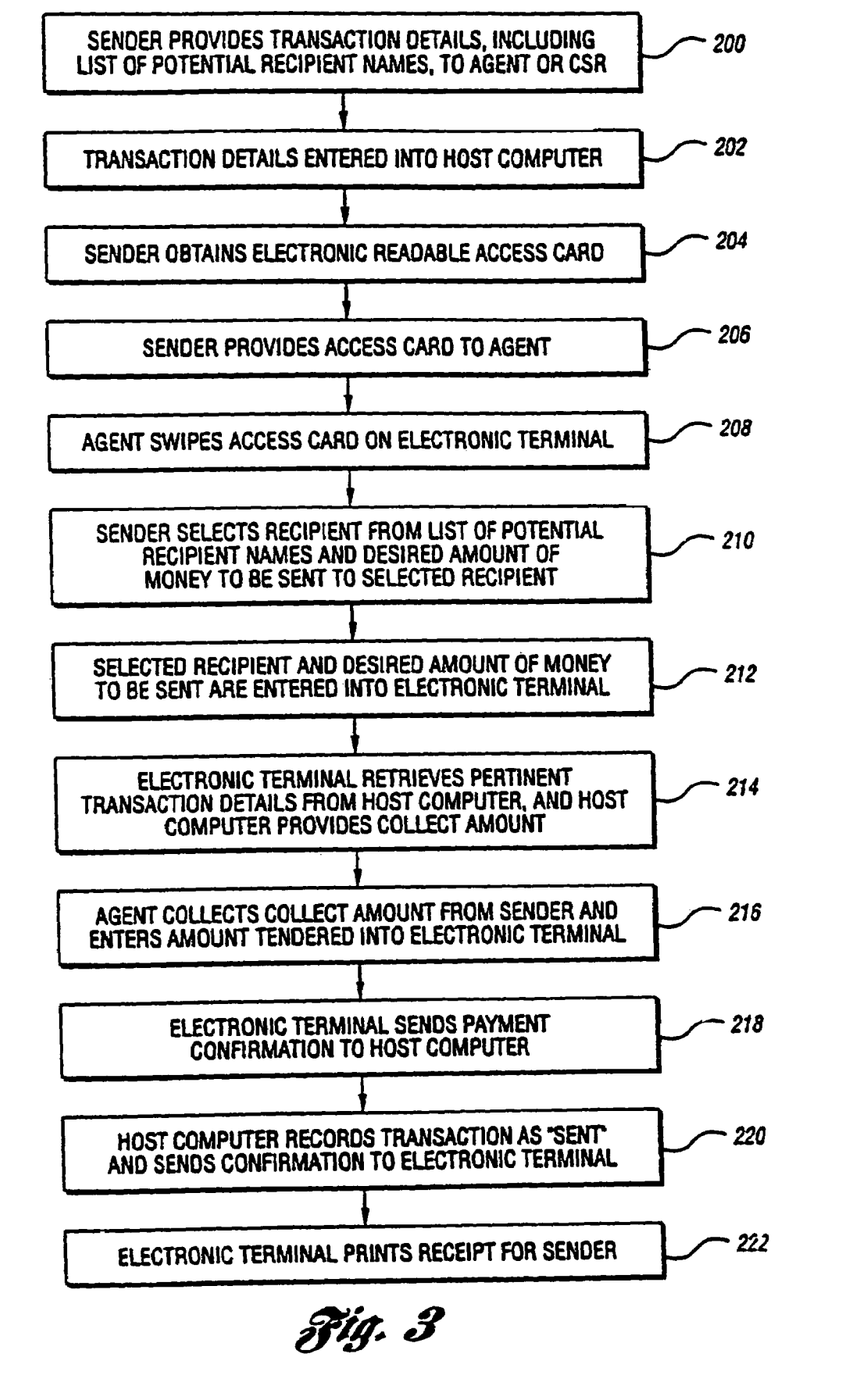
FIG. 3 is a flow chart illustrating operation of a system and/or method in accordance some embodiments of the present invention for performing a card-assisted send transaction.

FIG. 3 is a flow chart illustrating operation of a method or system, such as system 10, for performing a card-assisted send transaction according to the invention. Similar to the send transaction, the card-assisted send transaction can be divided into a transaction set-up or staging process and a transaction fulfillment process. At process 200, the transaction staging process begins by the sender providing transaction details to an agent at the agent location or to the CSR or other employee of the financial services institution. Transaction details may include a list of one or more potential recipient names; information about each recipient such as address and telephone number; and information about the sender such as name, address and telephone number. The transaction details are then entered into host computer 18 at process 202. Next, at process 204, the sender obtains an access card from the financial services institution for accessing the transaction details stored on the host computer 18. The access card contains a card control code (CCC), or identification code, that correspondents to the particular transaction details provided by consumer, and the CCC is readable by an electronic device, such as electronic terminal 22. Alternatively, the access card may be generated by the financial services institution based on historical transactions of the sender.

At process 206, the transaction fulfillment process begins by the sender providing the access card to the agent at the agent location. Next, at process 208, the agent enters the CCC into electronic terminal 22 by swiping the access card on electronic terminal 22 to thereby access or retrieve the list of potential recipient names. For example, the list of potential recipient names may be displayed on a display device of electronic terminal 22. Alternatively, the CCC may be entered into electronic terminal 22 in any suitable manner such as by manually entering the control code on keypad 23.

At process 210, the sender then selects a recipient from the list of potential names and a desired amount of money to be sent to the selected recipient. The selected recipient and the desired amount of money to be sent are entered into electronic terminal 22 at process 212. If the desired amount of money to be sent is over a certain amount, host computer 18 may also request supplemental information from the sender, such as driver's license number, social security number, date of birth, etc. in order to comply with institutional and/or regulatory requirements. Next, at process 214, the electronic terminal retrieves pertinent transaction details from host computer 18, and the host computer provides a collect amount, which represents the desired amount of money to be sent plus any transaction fee and taxes, if applicable. The agent then collects the collect amount from the sender and enters the amount tendered into electronic terminal 22 at process 216. Electronic terminal 22 then sends payment confirmation to host computer 18 at process 218. Next, at process 220, host computer 18 records the send transaction as "sent" and sends confirmation to electronic terminal 22. At process 222, electronic terminal 22 prints a receipt for the sender. It should be noted that for future card-assisted transactions, processes 200 and 202 need only be performed if necessary to update or otherwise modify the list of recipient names or other transaction details.

Alternatively, the access card may be used with kiosk 16 or other transaction staging device to initiate direct contact with the CSR. For example, the access card may be swiped on kiosk 16 to initiate a video conference with the CSR. The CCC from the access card is then used to retrieve pertinent transaction details from host computer 18, including the list of potential recipient names. The send then selects a recipient from the list of potential recipient names, and provides a desired amount of money to be sent to the selected recipient. Next, the CSR provides the sender a SCC and a transaction amount to complete the transaction staging process. The transaction fulfillment process may then proceed in a manner similar to the transaction fulfillment process described above and illustrated in FIG. 2.

As yet another alternative, the access card may be used with kiosk 16 or other transaction staging device to obtain direct access to host computer 18. For example, the access card may be swiped on kiosk 16 to establish a direct or indirect connection to host computer 18. The transaction staging process and the transaction fulfillment process may then be carried out on kiosk 16 by responding to questions generated by host computer 18 and displayed on kiosk 16.

Figure 4:
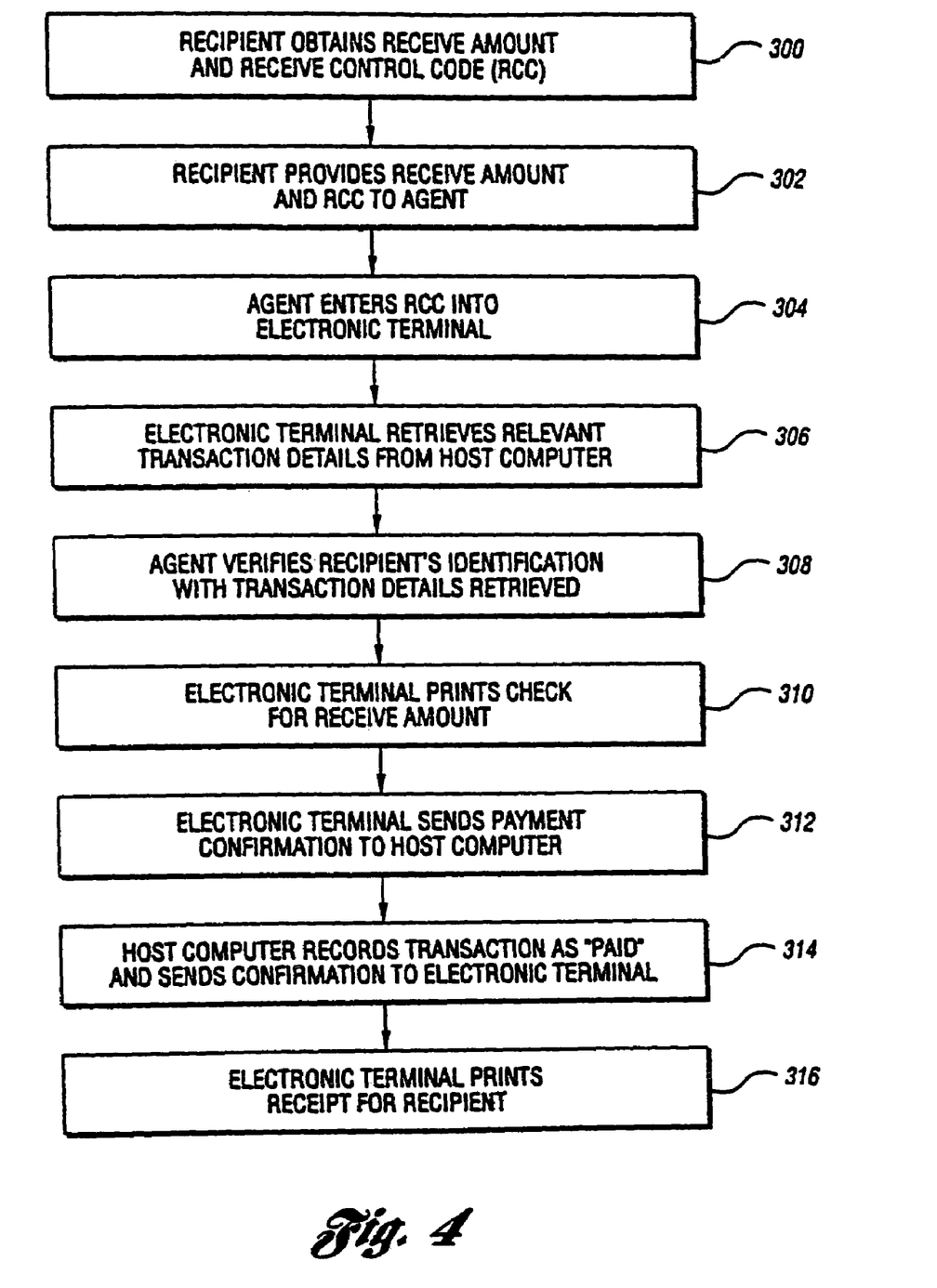
FIG. 4 is a flow chart illustrating operation of a system and/or method according to embodiments of the present invention for performing a receive transaction.

FIG. 4 is a flow chart illustrating operation of a method or system, such as system 10, for performing a receive transaction according to the invention. The receive transaction can also be divided into a transaction set-up or staging process and a transaction fulfillment process. At process 300, the transaction staging process begins with the recipient obtaining a receive amount and a receive control code (RCC), or identification code, for uniquely identifying the receive transaction on host computer 18. The RCC may be obtained from the CSR using the telephone 12. Alternatively, the RCC may be obtained using any suitable electronic transaction staging device. While the RCC is preferably a numeric code, the RCC may only be valid for a predetermined amount of time, such as 15 minutes, and/or at a predetermined location or locations so as to reduce the potential for theft and/or fraud.

At process 302, the recipient begins the transaction fulfillment process by providing the receive amount and RCC to an agent at the agent location. At process 304, the agent enters the receive amount and RCC into electronic terminal 22. Next, at process 306, electronic terminal 22 retrieves all relevant transaction details from host computer 18 via a connection with host computer 18. If the receive amount is over a certain amount, host computer 18 may also request supplemental information from the recipient, such as driver's license number, social security number, date of birth, etc. in order to comply with institutional and/or regulatory requirements. At process 308, the agent verifies the recipient's identification with the transaction details retrieved. Next, at process 310, electronic terminal 22 is used to print a check or other negotiable instrument, such as a cash voucher, for the receive amount. Advantageously, electronic terminal 22 may be used to print multiple checks or other negotiable instruments if desired by the recipient. Alternatively, the agent may dispense a telephone card and/or money card to the recipient. The agent may also load funds onto a card provided by the recipient. At process 312, electronic terminal 22 sends payment confirmation to host computer 18. Next, at process 314, host computer 18 records the transaction as "paid" and sends confirmation to electronic terminal 22. At process 316, electronic terminal 22 prints a receipt for the recipient.

Figure 5:
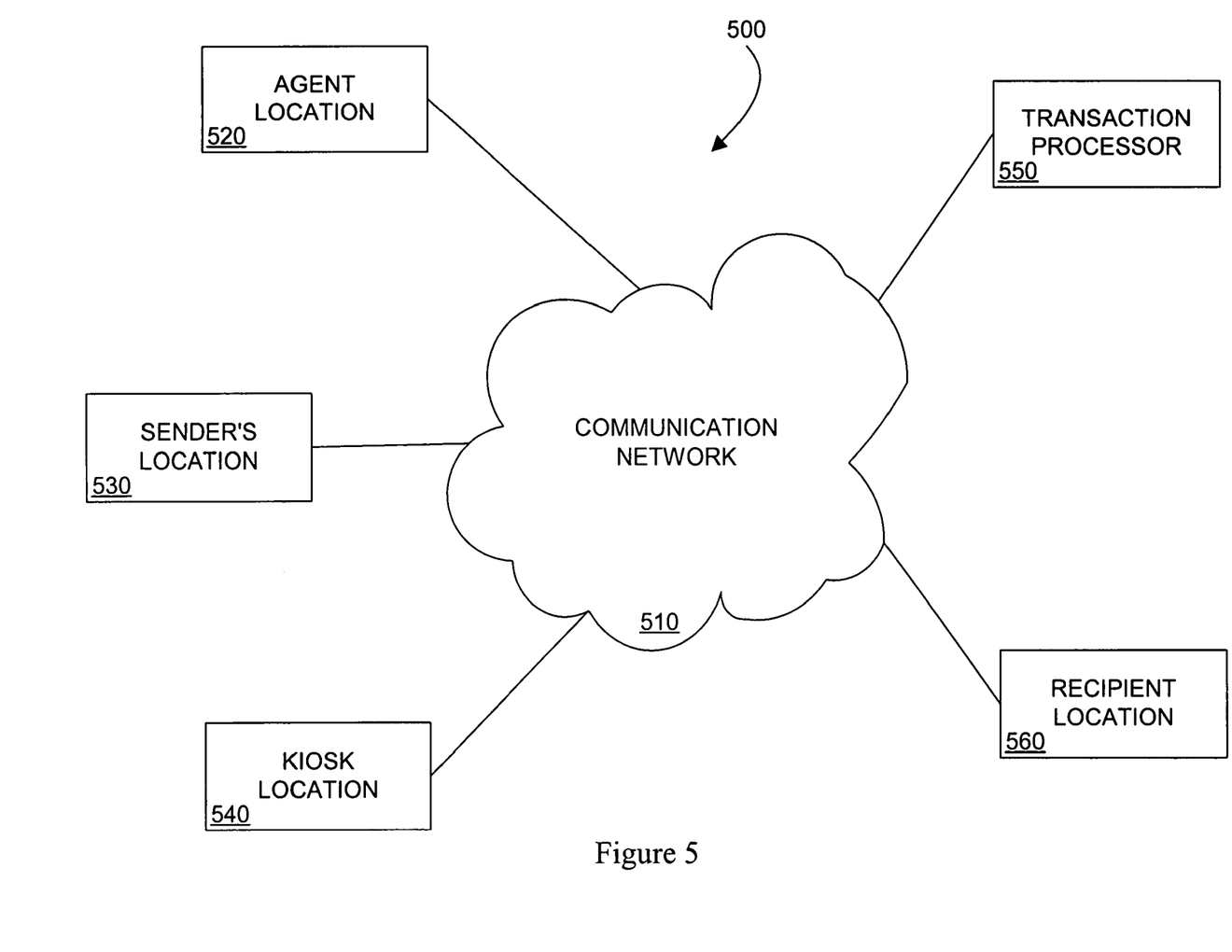
FIG. 5 is a schematic diagram of a value transfer system in accordance with another embodiment of the present invention.

Turning to FIG. 5, a schematic diagram of a value transfer system 500 is illustrated. Value transfer system 500 includes an agent location 520, a sender location 530, a kiosk location 540, a transaction processor 550, and a recipient location 560 each in communication via a communication network 510. Communication network 510 can be any communication network capable of providing communications between the various entities of value transfer system 500. In some embodiments, communication network 510 is the Internet providing message based communication between any of agent location 520, sender location 530, kiosk location 540, transaction processor 550, and/or recipient location 560. In other embodiments, communication network 510 comprises a TCP/IP compliant virtual private network (VPN). In yet other embodiments, communication network 510 includes the Internet for communication between sender location 530 and transaction processor 550, a VPN between kiosk location 540 and transaction processor 550, another VPN between agent location 520 and transaction processor 550, and a VPN between transaction processor 550 and recipient location 560. However, it should be recognized that other communication networks could be used to provide similar functionality. For example, communication network 510 can be a local area network (LAN), a wide area network (WAN), a telephone network, a cellular telephone network, a virtual private network (VPN), the Internet, an optical network, a wireless network, or any other similar communication network or combination thereof.

As just one example, a sender may initiate a staged value transfer using value transfer system 500. To do so, the sender may contact transaction processor 550 from sender location 530 or kiosk location 540. As part of such contact, the sender indicates that a value transfer is desired, the amount of the value transfer, the sender's location, and/or the recipient and recipient's location. This information is recorded by transaction processor 550 and used by transaction processor to determine a quote to complete the requested value transfer. The quote is provided to the sender along with an identification code that identifies the value transfer initiated by the sender. The sender is then directed to agent location 520 where funds for the value transfer, including the transaction fee are tendered.

The sender proceeds to agent location 520 and provides the identification code. The identification code is in turn provided to transaction processor 550. Transaction processor 550 then provides at least some of the previously staged transaction detail to agent location 520. In some cases, the transaction fee is different at agent location 520 than where the initial staging of the transaction was performed. In such cases, either the original transaction fee quote is utilized to complete the transaction, or a quote for the transaction fee associated with agent location 520 can be utilized to complete the transaction. In one particular embodiment, the lower of the initial quote or the quote associated with agent location 520 is utilized.

Thus, in some embodiments, the present invention provides a mechanism for selecting a quote from one or more quotes associated with various stages of a transaction. Thus, in the previous example, a quote associated with the initiation stage of the transaction can be compared with a quote associated with the completion stage of a transaction, and the sender can be given the lower of the two quotes.

It should be recognized that a transaction can have many stages with quotes associated with each stage of the transaction, and the systems and methods of the present invention can be utilized to select from a variety of quotes associated with different transaction stages, and provide the selected quote to the sender. Thus, for example, a three stage transaction may include a general stage where overview information about a proposed transfer is received and a general quote associated therewith is provided to a sender. This stage can be followed by a specific stage where concrete information about the transfer is provided and a more concrete quote is provided in response. Then, a completion stage can be performed where the finds are provided to complete the transaction, and a quote associated with that stage can be provided. Based on this discussion, one of ordinary skill in the art will recognize other staged transactions, and/or transaction stages that are possible. Further, one of ordinary skill in the art will recognize the applicability of selecting between varying quotes associated with the various stages and in accordance with the present invention.

Kiosk location 540 includes a kiosk providing hardware to access one or more functions facilitated by transaction processor 550. In some cases, kiosk location 540 is near agent location 520, while in other cases, kiosk location 540 is remote from agent location 520. In one particular embodiment, kiosk location 540 is located in a supermarket that also includes agent location 520.

In particular embodiments, kiosk location 540 includes sufficient capability that it can perform functions associated with one or all stages of a transaction. Thus, for example, in some embodiments, kiosk location 540 is used to perform one or more initiation stages of a transaction, and in other embodiments, kiosk location 540 is used for completion stages of a transactions. In some cases, a transaction fee quote associated with a transaction stage performed in relation to kiosk location 540 varies based on the location of kiosk 540 and/or the type of hardware provided at kiosk 540 to effectuate a transaction. Thus, for example, all kiosks in a particular zip code may offer one transaction fee structure, while kiosks in another zip code offer a different transaction fee structure. Alternatively, or in addition, one transaction fee structure may be used where a sender uses a telephone provided at kiosk location 540 to perform a transaction as opposed to using a terminal provided at the kiosk that is communicably coupled to the Internet. Based on the disclosure provided herein, one of ordinary skill in the art will recognize other possible variables that can effect a quoted and/or imposed transaction fee.

Sender location 520 can be any location including hardware sufficient to access transaction processor 550. Thus, in some cases, sender location 520 is the sender's residence that includes a PC capable of accessing the Internet, or a telephone capable of communicating with transaction processor 550. In other cases, sender location 520 can include a telephone booth at some given location, a mobile telephone at some location, a PC at the sender's work or a public location. Based on the disclosure provided herein, one of ordinary skill in the art will recognize a number of devices capable of communicating with transaction processor 550 that may be included as part of and/or define sender location 530. As with kiosk location 540, a transaction fee quote associated with a transaction stage performed in relation to sender location 530 varies based on sender location 530 and/or the type of hardware used to effectuate the transaction via sender location 530. Thus, for example, a sender may be asked for a zip code of sender location 530 and a transaction quote be provided based on that zip code. Alternatively, where the transaction is effectuated via a telephone, a caller identification function can be used to provide the sender's location from which the quote is based. Alternatively, or in addition, one transaction fee structure may be used where a sender uses a telephone at sender location 530 to perform a transaction as opposed to using a PC at sender location 530 to perform the transaction. Based on the disclosure provided herein, one of ordinary skill in the art will recognize other possible variables that can effect a quoted and/or imposed transaction fee.

Agent location 520 can be any location where an agent associated with transaction processor 550 is located. In various cases, agent location 520 provides the means for accepting funds and/or value associated with a value transfer. Thus, in some cases, agent location 520 includes a cash register for receiving and accounting for funds and an electronic fulfillment device as previously discussed and included in the claims of the parent to the present application. Based on the disclosure provided herein, one of ordinary skill in the art will recognize many other devices and/or combinations thereof that are useful in relation to performing functions of agent location 520.

Figure 6:
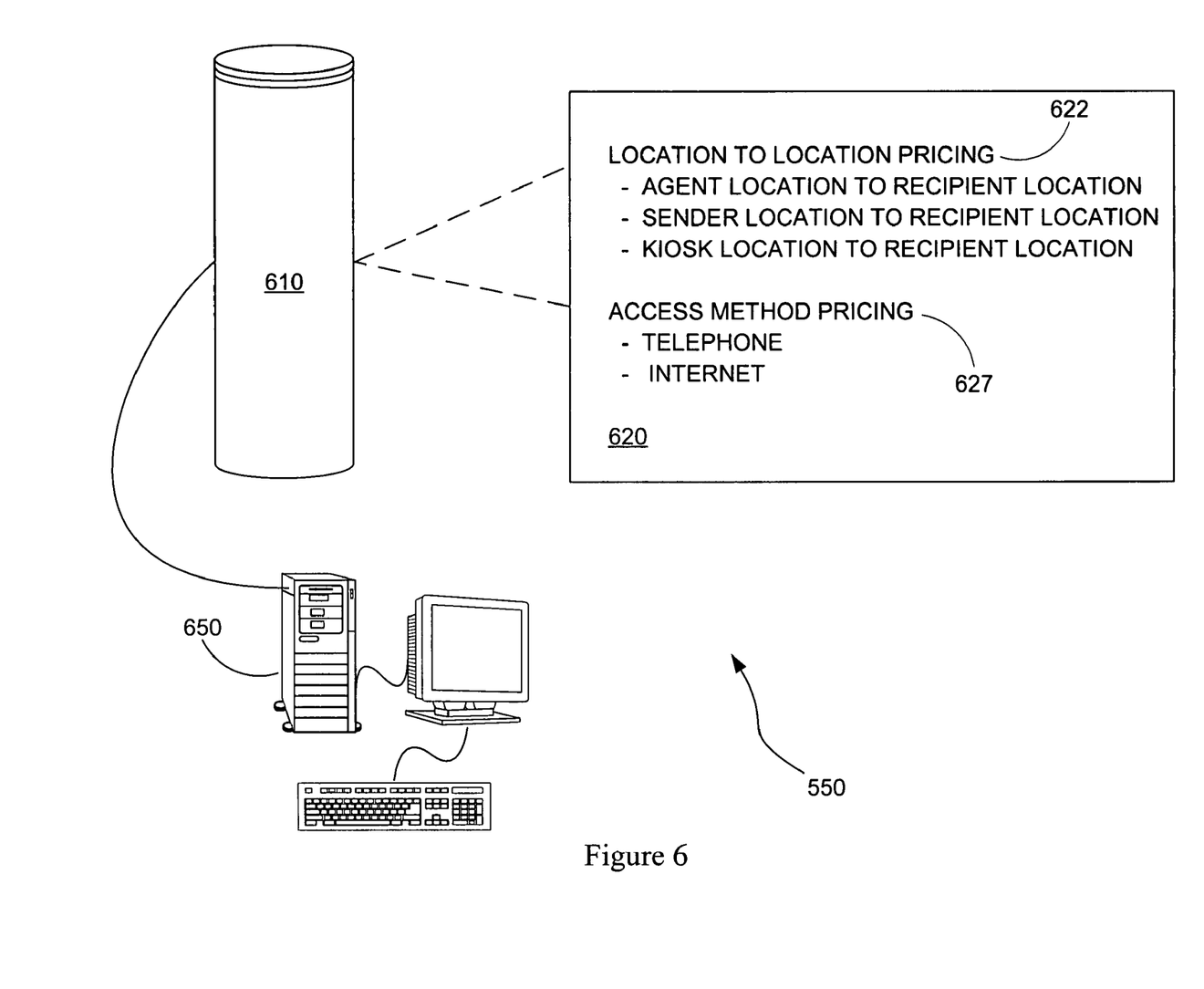
FIG. 6 is a schematic diagram of a transaction processor useful in relation to the value transfer system of FIG. 5.

Turning to FIG. 6, a schematic diagram of an embodiment of transaction processor 550 is illustrated. As illustrated, transaction processor 550 includes a computer 630, and a database 610. Database 610 includes a table 620 incorporating transaction fee structures associated with value transfer system 500. Database 610 can be implemented using any form of computer readable medium including a network server, a hard disk drive, a read only memory, a random access memory, and/or the like. Such a computer readable medium can be implemented as part of computer 630 or external to computer 630. In some cases, the computer readable medium is implemented in part internally to computer 630 and in part external to computer 630. Thus, for example, in one embodiment, the computer readable medium includes a random access memory and hard drive integral to computer 630, and a network server communicably coupled to computer 630.

As illustrated, table 620 includes quote information related to location to location pricing 622, and access method pricing 627. However, it should be recognized that a transaction fee structure including other pricing variables and/or combination of variables can be implemented in table 620 in accordance with the present invention. Thus, one of ordinary skill in the art will recognize other transaction fee variables and/or combinations thereof. For example, one of ordinary skill in the art will recognize a transaction fee structure that is based on a combination of sender location, recipient location, and method of access.

Figure 7:
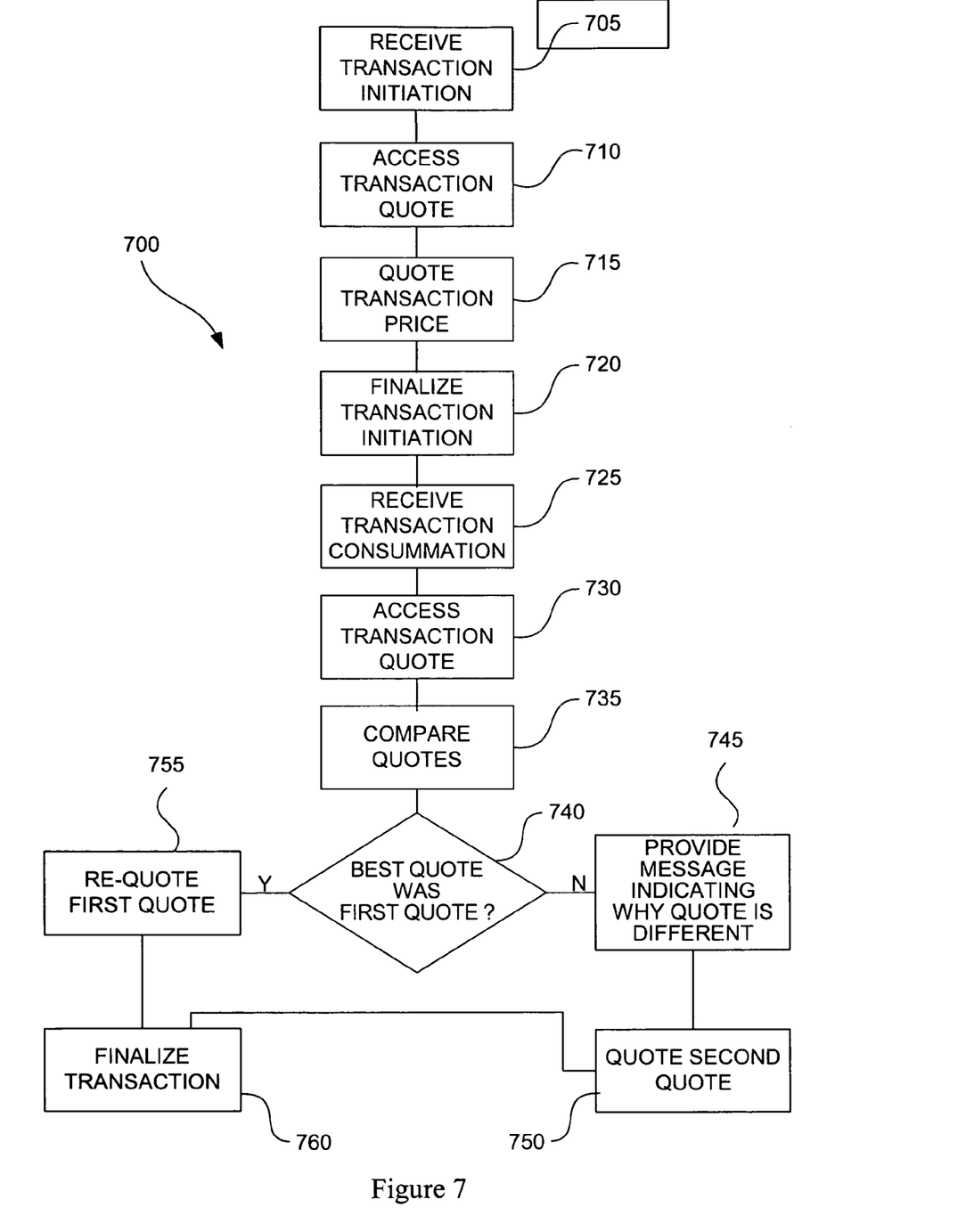
FIG. 7 is a flow diagram illustrating a method in accordance with various embodiments of the present invention for providing and/or utilizing quotes in relation to a value transfer.

FIG. 7 is a flow diagram 700 illustrating a method in accordance with various embodiments of the present invention for providing and/or utilizing quotes accessed from table 620. Following flow diagram 700, a transaction initiation is received (block 705). Such a transaction initiation can include a sender contacting transaction processor 550 and indicating that a value transfer is desired and one or more details about the desired value transfer. In some embodiments, such a transaction initiation includes the initial stage(s) of a transaction and is performed from either sender location 530 or kiosk location 540.

In one particular embodiment, the transaction initiation is received via kiosk location 540. Such a transaction initiation can include the name and address of the sender, the amount of the transaction, the destination of the transaction, the name and address of the recipient, and/or the identification number of kiosk location 540. Of course, other types of information may be included as part of the initiation request, or various of the information may be automatically provided. For example, the identification number of kiosk location 540 may be automatically provided to transaction processor 550 from the kiosk at the location.

Based on the received transaction initiation, database 610 is accessed to determine a transaction fee quote associated with the requested value transfer (block 710). The accessed transaction fee quote information is then reported to the sender such that the sender can make a determination about proceeding with the transaction (block 715). In some cases, the transaction fee quote is provided separately to the user, while in other cases, the transaction fee quote is combined with the amount to be transferred along with any other taxes or charges into a total quote. The sender can then be queried in regards to continuing the transaction.

Where the sender decides to proceed with the transaction, the transaction initiation is finalized (block 720). Finalizing the transaction initiation can include storing the transaction information along with the provided transaction fee quote and/or total transaction cost quote to the database. In addition, an identification code can be generated to identify the transaction initiation information. Such an identification code can include a group of alpha-numeric characters that uniquely identify the transaction. In one particular embodiment, the identification code includes the senders name and the current date combined into a single character string.

The sender can then go to agent location 520 or kiosk location 540. At either location, the sender can provide the identification code to transaction processor as part of completing the previously initiated transaction (block 725). As part of the transaction completion portion, agent location 520 or kiosk 520, and/or the method used to complete the transaction can also be provided. Thus, in this particular embodiment, a first stage of the transaction can be interpreted to include the transaction initiation, while the second stage of the transaction can be interpreted to include the transaction completion. Of course, one of ordinary skill in the art will recognize many other possible divisions of a transaction into two or more stages. Thus, for the purpose of interpreting the claims, a stage can be any portion of a transaction.

Having received the identification code, the transaction initiation information previously provided is used in combination with the respective agent location 520 or kiosk location 540, and/or method to complete the transaction to determine a transaction fee quote. Such a transaction fee quote is determined by accessing table 620 of database 610 (block 730). The quote provided in relation to the initiated transaction can then be compared to the quote related to completing the transaction (block 735).

Where the quote provided in relation to the initiation is the lower of the two quotes (block 740), the first quote is again provided to the sender in relation to the transaction (block 755), and the transaction is finalized by collecting the transfer amount, transaction fee as quoted and proceeding to transfer the finds to a recipient (block 760). Collection of the funds can be done by a clerk at agent location 520, or via a machine that accepts cash or other payment located at either agent location 520 or kiosk location 540.

Alternatively, where the quote provided in relation to the completion is the lower of the two quotes (block 740), a message is provided to the sender indicating that a better quote has been located and offering the sender the lower price (block 745). The lower quote is then provided to the sender (block 750), and if agreed to by the sender, used in place of the initial quote to consummate the transaction as previously discussed (block 760).

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for performing a value transfer, the method comprising:
   providing a staged transaction system, wherein the staged transaction system includes at least a first stage and a second stage;
   providing a first quote associated with the first stage using the transaction system, wherein the quote includes at least one fee associated with the value transfer;
   providing an identification code in association with the first stage;
   receiving a request to perform the second stage, wherein the request includes the identification code;
   providing a second quote associated with the second stage using the transaction system and the identification code with the transaction system, comparing the first quote to the second quote, selecting one of the first quote and the second quote, wherein the selected quote is used to consummate the value transfer.

2. The method of claim 1, wherein the selected quote is the lower of the first quote and the second quote.

3. The method of claim 1, wherein using the selected quote comprises:
   adding the quote to an amount of the value transfer.

4. The method of claim 3, wherein consummating the value transfer includes receiving funds associated with the value transfer.

5. The method of claim 1, the method further comprising:
   providing an identification code in association with the first stage; and
   receiving a request to perform the second stage, wherein the request includes the identification code.

6. The method of claim 5, the method further comprising:
   storing information associated with the first stage, wherein the information includes the amount to be transferred in association with the value transfer, the first quote, and the identification code.

7. The method of claim 6, wherein receiving the request to perform the second stage comprises entering the identification code via an electronic transaction fulfillment device.

8. The method of claim 1, wherein selecting one of the first quote and the second quote comprises comparing the first quote and the second quote.

9. The method of claim 1 wherein using the selected quote to consummate the value transfer is associated with the second stage.

10. The method of claim 1 wherein the identification code comprises an alphanumeric string of characters.

11. The method of claim 1 wherein the identification code comprises a user name and a date combined into a single character string.

12. The method of claim 1 wherein the staged transaction system further includes a third stage, and the method further includes:
    receiving a request to perform the third stage, wherein the request includes the identification code;
    accessing a third quote associated with the third stage, after the accessing of the first and second quotes; and
    selecting one of the first, second and third quotes to consummate the value transfer.

13. A method for performing a money transfer send transaction, the method comprising:
    receiving a request for a money transfer send transaction;
    providing a first quote associated with the send transaction wherein the first quote includes at least one fee;
    receiving a request to consummate the send transaction;
    obtaining a second quote associated with the request to consummate the send transaction, wherein the obtaining of the second quote occurs after the providing of the first quote; and
    selecting one of the first quote and the second quote, wherein the selected quote is used to consummate the send transaction.

14. The method of claim 13, wherein the request for the send transaction is received from a user location.

15. The method of claim 13, wherein the request for the send transaction is received from a kiosk.

16. The method of claim 13, wherein the request to consummate the send transaction is received from an agent location.

17. The method of claim 13, the method further comprising:
    providing an identification code in response to the request for the send transaction, wherein the identification code is received as part of the request to consummate the send transaction.

18. The method of claim 17, the method further comprising:
    storing information associated with the request for the send transaction, wherein the information includes the amount to be transferred in association with the send transaction, the first quote, and the identification code.

19. The method of claim 17, wherein receiving the request to consummate the send transaction comprises entering the identification code via an electronic transaction fulfillment device.

20. The method of claim 13, wherein selecting one of the first quote and the second quote comprises comparing the first quote and the second quote.

21. The method of claim 13 wherein the accessing the second quote is in response to the request to consummate the send transaction.

22. A system for providing financial transactions, the system comprising:
a computer including a processor and a computer readable medium, wherein the computer readable medium comprises instructions executable by the processor to:
receive a request for a transaction;
obtain a first quote in relation to the transaction wherein the first quote includes at least one fee for consummating the transaction;
receive a request to consummate the transaction; and
thereafter obtain a second quote in relation to the request to consummate the transaction.

23. The method of claim 22, wherein the instructions are further executable to:
providing an identification code in response to the request for the transaction.

24. The method of claim 23, the method further comprising:
storing information associated with the request for the transaction, wherein the information includes the amount to be transferred in association with the transaction, the first quote, and the identification code.

25. The system of claim 23 wherein the computer readable medium further comprises instructions executable by the processor to associate the identification code with the first quote and with the second quote.

26. A method for marketing financial transfer transactions, the method comprising:
providing a flexible rating mechanism that is configured to dynamically develop a transaction fee based on criteria relevant to a given transaction;
monitoring a financial transaction market to obtain data relating to the criteria;
providing a quote for performing a financial transfer transaction using the flexible rating mechanism; and
fixing a rate based at least in part on monitoring the financial transaction market.

27. The method of claim 26, wherein the financial transfer transaction is a money transfer.

28. The method of claim 26, wherein fixing the rate includes setting a rate for performing the financial transfer transaction, and wherein the fixed rate is based at least in part on one or more of the following: a geographic location of the sender, a geographic location of the recipient, a time of day that the financial transfer transaction is initiated, an amount of time required to complete the financial transfer transaction, a type of financial transfer transaction, a type of recipient, and a type of sender.

29. The method of claim 28, wherein identifying the type of sender includes characterizing the frequency at which the sender performs financial transfer transactions.

30. The method of claim 26, wherein monitoring the financial transaction market includes monitoring one or more of the following characteristics:
monitoring a transaction cost associated with a similar financial transfer transaction product; and
monitoring a volume of the financial transaction market serviced by a transaction processor.

31. The method of claim 30, wherein monitoring the volume of the financial transaction market includes monitoring one or more of the following:
a net volume, wherein the net volume is the volume of the value of transaction fees associated with financial transfer transactions;
a gross volume, wherein the gross volume is the volume of the value of financial transfer transactions;
a net time volume, wherein the net time volume is the volume of the value of transaction fees during a period of time;
a gross time volume, wherein the gross time volume is the volume of the value of financial transfer transactions during a period of time;
a net location volume, wherein the net location volume is the volume of the value of transaction fees at a location; and
a gross location volume, wherein the gross location volume is the volume of the value of financial transfer transactions at a location.

* * * * *